US010710626B2

(12) United States Patent
Strong et al.

(10) Patent No.: US 10,710,626 B2
(45) Date of Patent: *Jul. 14, 2020

(54) STEERING WHEEL COVER

(71) Applicant: Hopkins Manufacturing Corporation, Emporia, KS (US)

(72) Inventors: Lynn Curtis Strong, Auburn, KS (US); Kyle M. Bennett, Emporia, KS (US)

(73) Assignee: Hopkins Manufacturing Corporation, Emporia, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/673,158

(22) Filed: Nov. 4, 2019

(65) Prior Publication Data

US 2020/0062288 A1 Feb. 27, 2020

Related U.S. Application Data

(63) Continuation of application No. 16/295,168, filed on Mar. 7, 2019, now Pat. No. 10,556,613.

(60) Provisional application No. 62/644,109, filed on Mar. 16, 2018.

(51) Int. Cl.
*B62D 1/06* (2006.01)

(52) U.S. Cl.
CPC ................................ *B62D 1/06* (2013.01)

(58) Field of Classification Search
CPC .......... B62D 1/06; B62D 1/11; Y10T 74/2087
See application file for complete search history.

(56) References Cited

U.S. PATENT DOCUMENTS 10,556,613 B2 * 2/2020 Strong ..................... B62D 1/06

* cited by examiner

*Primary Examiner* — Adam D Rogers
(74) *Attorney, Agent, or Firm* — Hovey Williams LLP (57) ABSTRACT

A steering wheel cover has an inner core and an outer casing. The inner core has a series of alternating ribs and openings that together form a spring-like structure that more easily fits over a steering wheel while retaining its initial shape once installed. The inner core requires significantly less material than conventional steering wheel cover cores

17 Claims, 9 Drawing Sheets

STEERING WHEEL COVER

RELATED APPLICATION

This is a continuation application claiming benefit priority to earlier filed U.S. application Ser. No. 16/295,168, filed Mar. 7, 2019 entitled "STEERING WHEEL COVER", which claims benefit priority to earlier filed U.S. provisional patent application Ser. No. 62/644,109, filed on Mar. 16, 2018 entitled "STEERING WHEEL COVER CORE", both of which are incorporated by reference in their entirety into the present application.

BACKGROUND

Figure 1:
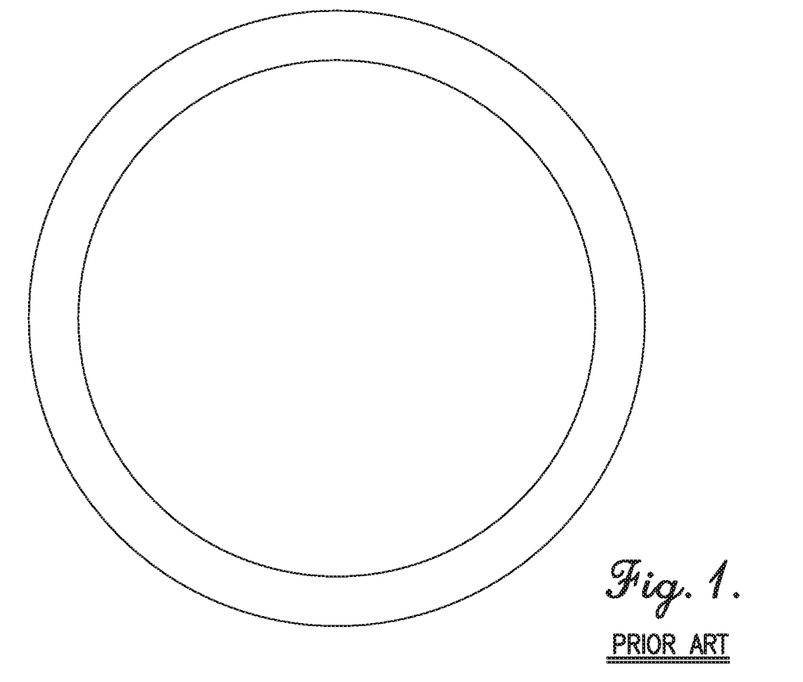
FIG. 1 is a side elevation view of a core of a prior art steering wheel cover.

Steering wheel covers are often installed over vehicle steering wheels to enhance driver grip and comfort, personalize vehicle interiors, and protect the steering wheels from excessive wear. Conventional steering wheel covers typically include a semi-rigid core such as the one shown in prior art FIG. 1 and an outer casing made of fabric, leather, or other material. The core provides shape and cushioning and keeps the steering wheel in place on the steering wheel, and the casing provides grip and ornamentation.

The cores of some steering wheel covers are made of recycled rubber, which is relatively inexpensive but can emit unpleasant odors. Rubber cores are also not very stretchable, which makes installation difficult. Other steering wheel cover cores are made of molded Ethylene-Vinyl Acetate (EVA) foam and/or Thermoplastic Elastomers (TPE), both of which are substantially odorless, softer, and more elastic than recycled rubber, thus improving marketability and easing installation. However, EVA foam cores and TPE cores are costlier to produce than recycled rubber cores, and despite being more elastic than recycled rubber, are still difficult to install because they must be annularly stretched to fit over a steering wheel yet be resilient enough to retain their initial shape once installed.

SUMMARY

The present invention solves the above-described problems by providing a steering wheel cover having an improved core that more easily fits over a steering wheel while retaining its initial shape once installed. The core also requires significantly less material than conventional steering wheel cover cores and is therefore less expensive to produce.

BRIEF DESCRIPTION OF THE DRAWING FIGURES

Embodiments of the present invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Figure 2:
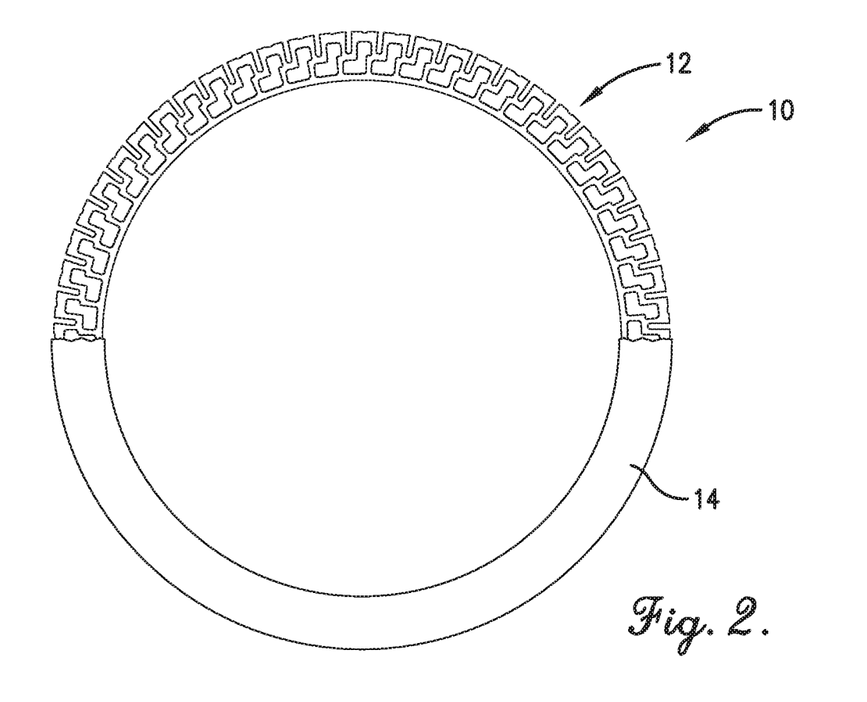
FIG. 2 is a side elevation view of a steering wheel cover constructed in accordance with an embodiment of the invention with part of its outer casing shown removed to reveal the underlying core.
Figure 3:
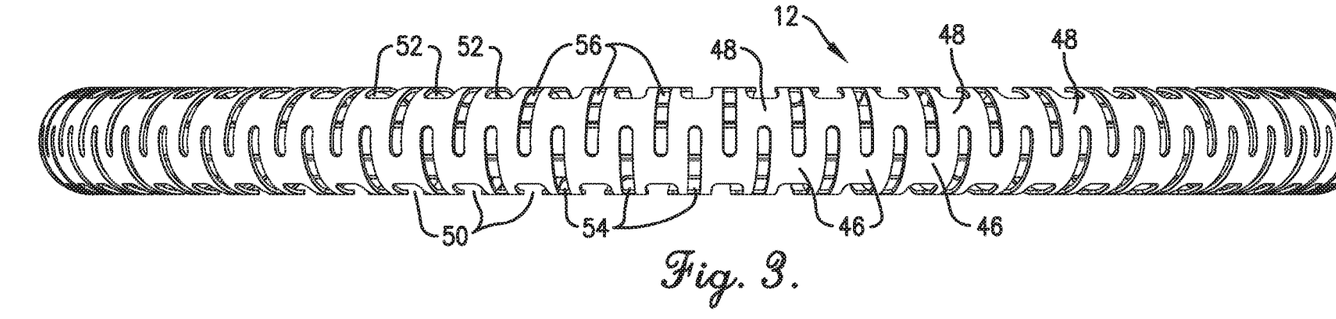
FIG. 3 is a top plan view of the steering wheel cover core of FIG. 2.
Figure 4:
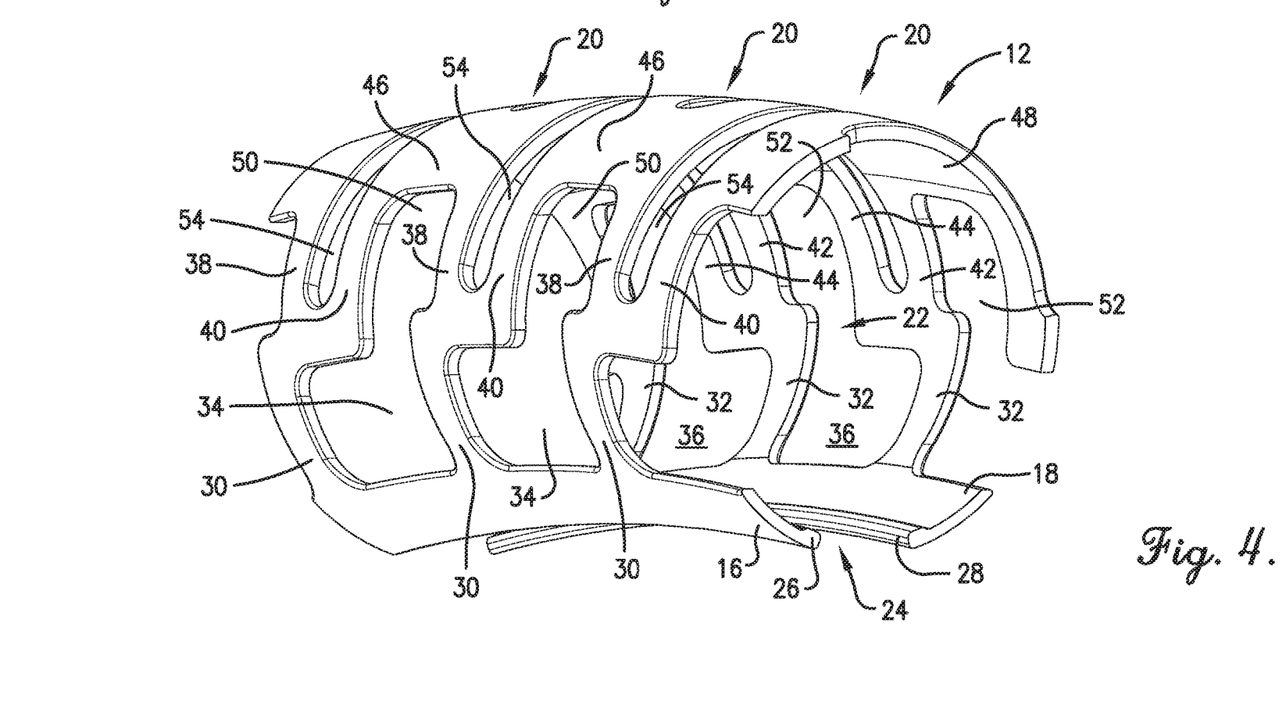
FIG. 4 is a fragmentary perspective view of the steering wheel cover core of FIG. 2.
Figure 5:
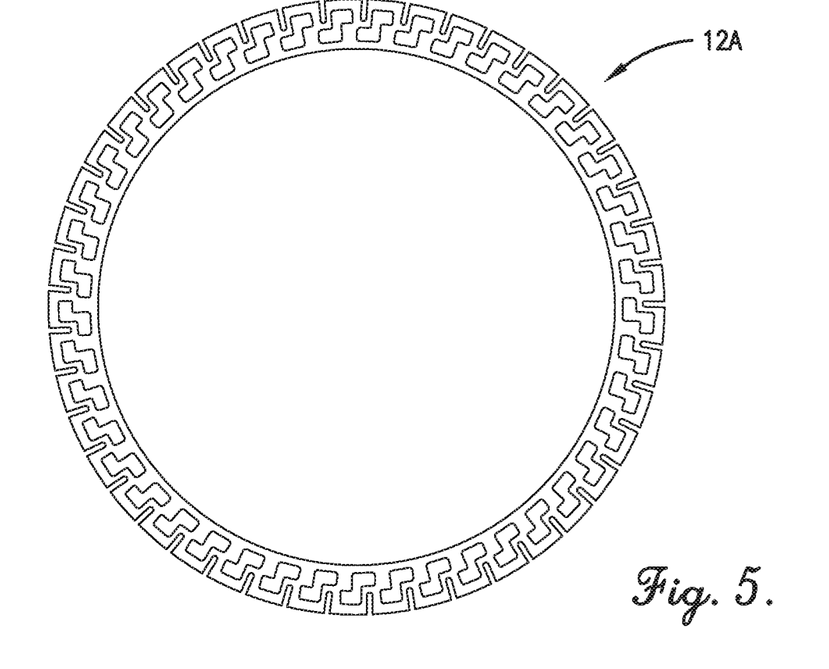
FIG. 5 is a side elevation view of a steering wheel cover core constructed in accordance with another embodiment of the invention.
Figure 6:
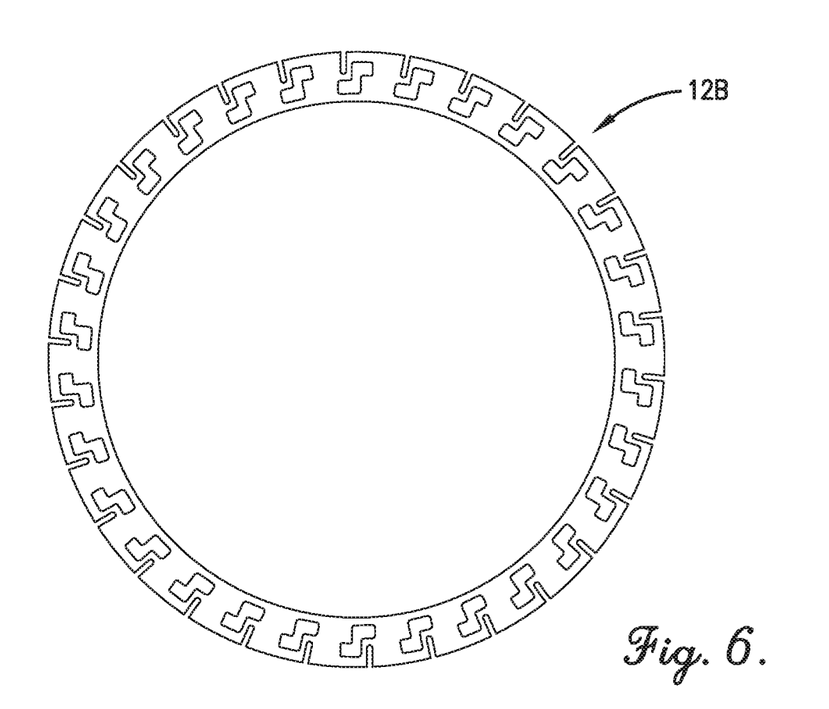
FIG. 6 is a side elevation view of a steering wheel cover core constructed in accordance with yet another embodiment of the invention.
Figure 7:
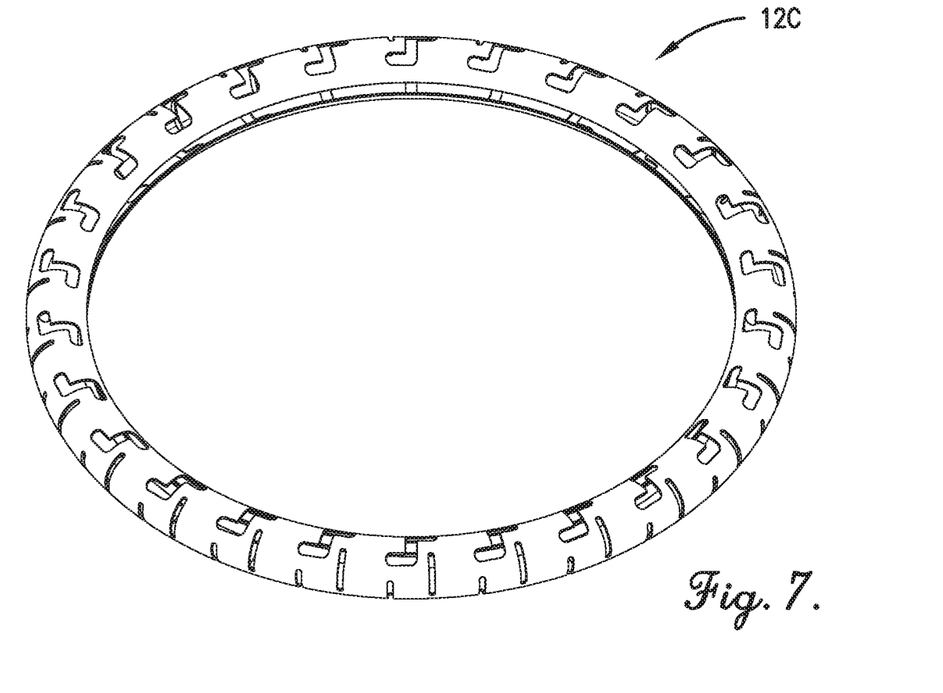
FIG. 7 is a perspective view of a steering wheel cover core constructed in accordance with yet another embodiment of the invention.
Figure 8:
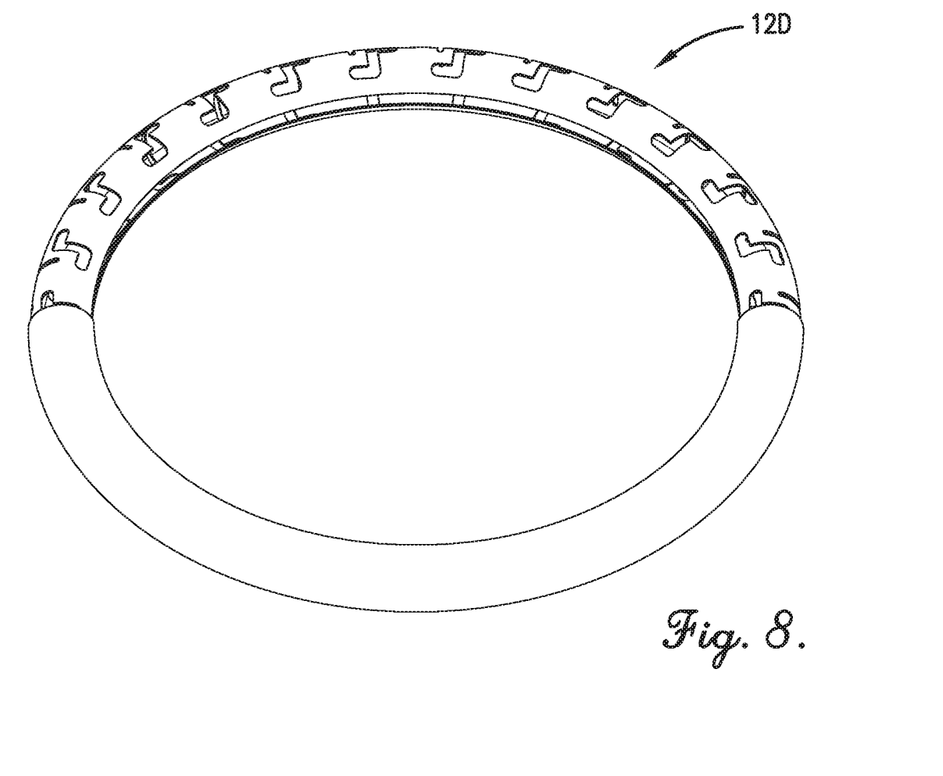
FIG. 8 is a perspective view of a steering wheel cover constructed in accordance with yet another embodiment of the invention with part of its outer casing shown removed.

The present invention provides several embodiments of steering wheel covers that may be used to cover the steering wheels of cars, trucks, boats, or any other vehicles. Each steering wheel cover has an inner core with a series of alternating ribs and slots or other openings that together form a spring-like structure that more easily fits over a steering wheel while retaining its initial shape once installed and that requires significantly less material than conventional steering wheel cover cores Specific embodiments of the steering wheel cover will now be described with reference to the attached drawing figures. Turning initially to FIGS. 2-4, a steering wheel cover 10 constructed in accordance with a first embodiment of the invention is illustrated. The steering wheel cover 10 broadly comprises an inner core 12 and a casing 14 wrapped around or otherwise attached around the core 12. The core 12 provides shape and cushioning and keeps the steering wheel cover 10 in place on the steering wheel, and the casing 14 provides grip and ornamentation.

Referring primarily to FIGS. 3 and 4, the inner core 12 includes front and rear spines 16,18 and a plurality of interconnecting ribs 20 that together define a hollow internal channel 22 that fits over a steering wheel. The core 12 may be formed of TPE material, molded EVA foam, rubber, or any other suitable material, and in one embodiment, has a thickness of approximately 0.55 inches, which is also 13.97 mm.

The front and rear spines 16, 18 are spaced apart from one another to create an annular gap 24 along the inner circumference of the core. The spines 16, 18 may be temporarily pulled apart to widen the gap 24 so the core may be pulled over a steering wheel as described in more detail below. The front spine 16 has an enlarged lip 26 and the rear spine 18 has a corresponding opposite enlarged lip 28 that may be gripped when installing the steering wheel cover and that help secure the core on the steering wheel once installed.

The ribs 20 extend in an arc between the front and rear spines 16, 18 so that the interior channel 22 has a circular or semi-circular cross section. Each rib 20 has a stem 30 connected to its front spine 16 and another stem 32 connected to it rear spine 18. The stems 30 on the front of the core are annularly offset from the stems 32 on the rear of the core. The stems 30 of adjacent ribs on the front side of the core form generally-rectangular shaped openings 34 in the front of the core, and the stems 32 of adjacent ribs on the rear side of the core form similar generally-rectangular shaped openings 36 in the rear of the core, the purposes of which are described below.

Each rib 20 also has a pair of branches 38, 40 connected to its stem 30 and another pair of branches 42, 44 connected to its opposite stem 32. The branches of adjacent ribs connect to form conjoined areas 46 on the front side of the core and corresponding but annularly offset conjoined areas 48 on the rear side of the core 12. The branches of adjacent ribs on the front side of the core also define generally-rectangular shaped openings 50 in the front of the core that connect to the openings 34, and the branches of adjacent ribs on the rear side of the core define generally-rectangular shaped openings 52 in the rear of the core that connect to the openings 36.

Each pair of branches 38, 40 on the front side of the core define a slot 54 between them, and each pair of branches 42,44 on the rear side of the core define a similar slot 56 between them.

The slots 54, 56 extend beyond the apex of the core 12 such that the slots 54, 56 on opposite sides of the core overlap on top of the core. The slots 54, 56 on opposite sides of the core are also offset such that no uninterrupted central spine is formed at the apex (top) of the core. In other words, the apex of the core consists of alternating and offset slots and branches, with the branches of adjacent ribs forming the conjoined areas.

The above-described stems, branches, conjoined areas, openings, and slots form a spring-like structure that retains its shape when on a steering wheel and that expands annularly to a stretched configuration to allow the core 12 to more easily be stretched over the steering wheel. Because the core has no solid or uninterrupted spine at its apex, it can stretch both around a steering wheel and annularly. An uninterrupted or solid spine with no slots, openings, etc. would prevent stretching from occurring except for the stretching resulting directly from the elasticity of the material.

The casing 14 at least partially encloses the core 12 as shown in FIG. 2 and may include ridges, grooves, nubs, grips, or high-friction material for increasing a driver's grip on the steering wheel. The casing 14 may also include stylistic designs, logos, prints, patterns, and other aesthetic features. The casing 14 may be formed of sewn and/or woven fabric, vinyl, or other stretchable material. The casing 14 may be sewn, glued, or otherwise attached to the core 12.

Attachment of the wheel cover 10 to a steering wheel will now be described in more detail. The spines 16, 18 of the core 12 are first pulled apart such that the gap 24 between the spines is larger than the diameter of the steering wheel. The wheel cover is then pulled over the steering wheel such that the spines 16, 18 are on opposite sides of the steering wheel. While the wheel cover is being pulled over the steering wheel, the ribs 20 between the spines 16, 18 stretch to ease installation of the wheel cover. Once the wheel cover is positioned over the steering wheel, the spines and ribs revert back toward their relaxed states to retain the wheel cover 10 on the steering wheel.

The above-described steering wheel cover 10 and other embodiments of the steering wheel cover described below provide several advantages. For example, the spring-like structure of the core 12 significantly reduces the forces required to stretch the steering wheel cover over a steering wheel while providing sufficient rigidity and shape memory when positioned on the steering wheel for retaining the core 12 and casing 14 firmly on the steering wheel. Experiments have shown that forces required to stretch the core 12 to a fixed displacement of 0.25 inches are reduced from approximately 57 pounds for prior art cores to approximately 19 pounds for the cores of the present invention. For example, unmodified TPE material requires a stretching force of approximately 57 pounds. TPE material with small holes requires a force of approximately 43 pounds. A core made of TPE materials with the above-described spring-like structure requires a force of only approximately 19 pounds.

The openings and slots in the core also reduce the amount of core material used by approximately 27% and in some cases even more. The openings and slots also provide a grip contour that allows a user to more firmly grasp the steering wheel.

Steering wheel covers constructed in accordance with other embodiments of the invention are illustrated in FIGS. 5-15. For example, steering wheel covers may have cores 12A, 12B, 12C, and 12D with wider stems and branches and smaller openings between the stems and branches as shown in FIGS. 5-8. This increases the rigidity of the cores while still preserving their spring-like characteristics.

Figure 9:
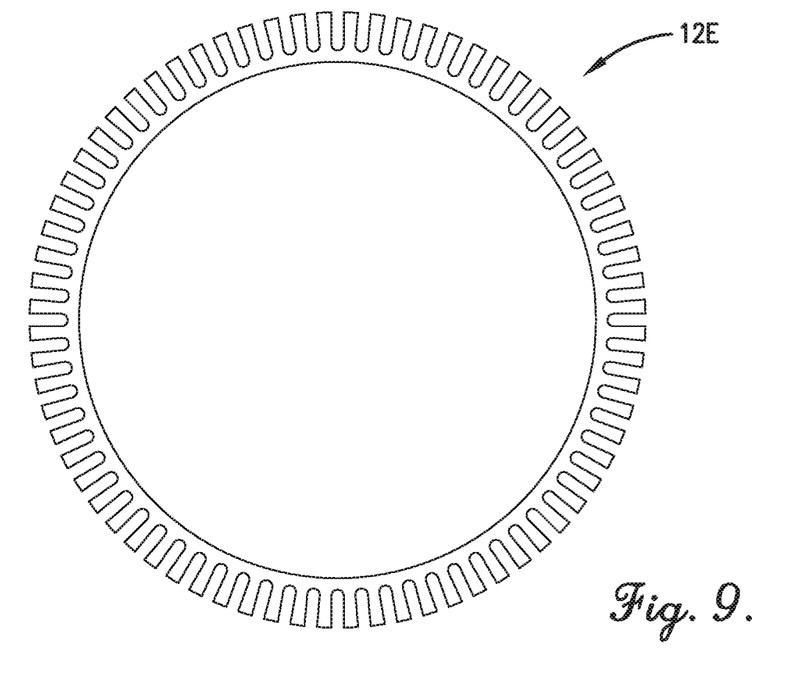
FIG. 9 is a side elevation view of a steering wheel cover core constructed in accordance with yet another embodiment of the invention.

A core 12E constructed in accordance with another embodiment of the invention is shown in FIG. 9. and has ribs that are simple bridges with no branches and stems. This simplifies the design of the core and allows for additional stretching.

Figure 10:
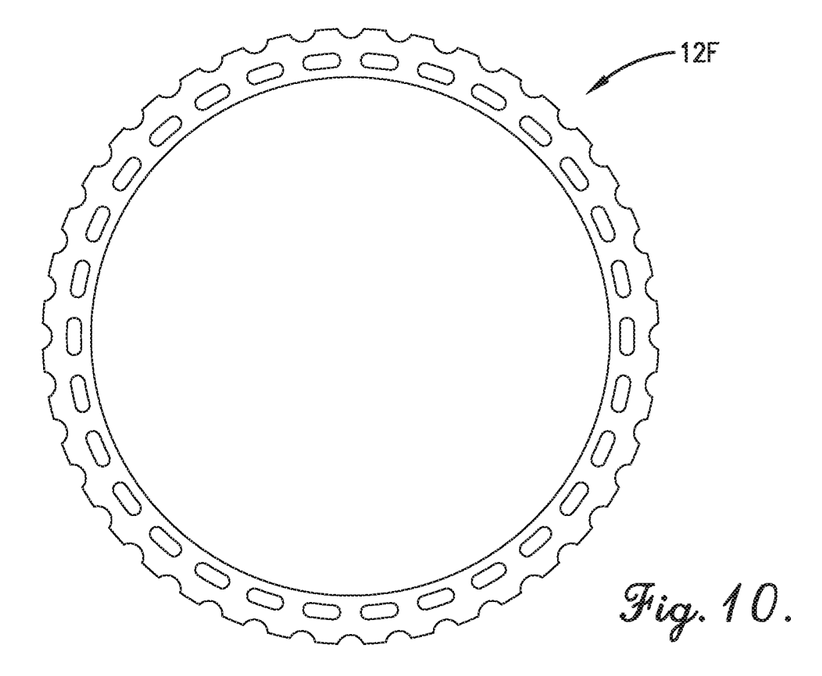
FIG. 10 is a side elevation view of a steering wheel cover core constructed in accordance with yet another embodiment of the invention.

A core 12F constructed in accordance with another embodiment of the invention is shown in FIG. 10 and includes ribs that form oval-shaped openings near their spines and oval or circular openings on top of the core.

Figure 11:
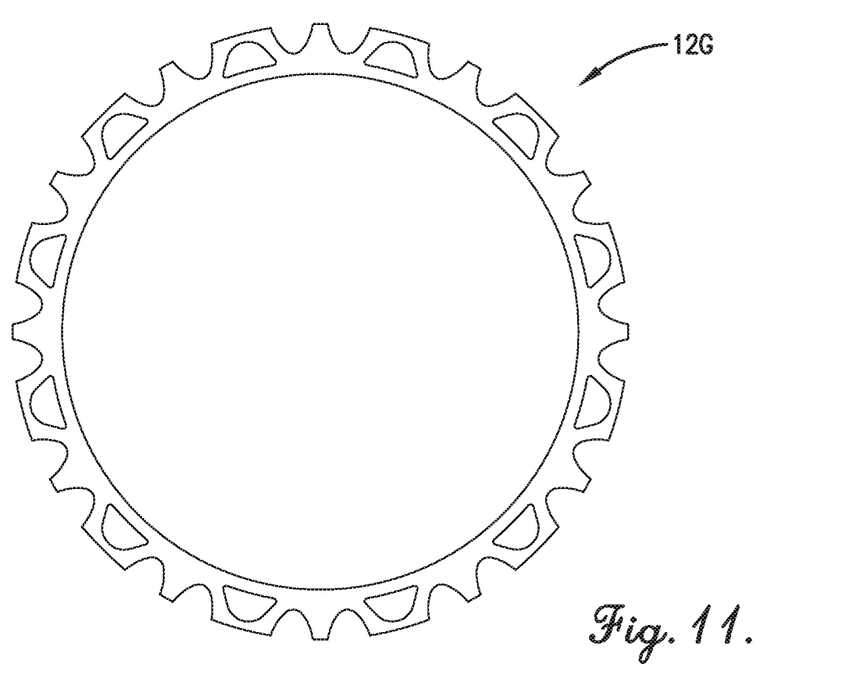
FIG. 11 is a side elevation view of a steering wheel cover core constructed in accordance with yet another embodiment of the invention.

A core 12G constructed in accordance with another embodiment of the invention is shown in FIG. 11 and includes ribs that form alternating relatively thin and relatively fat co-joined areas with semi-circular openings near their spines and oval-shaped openings on top of the core.

Figure 12:
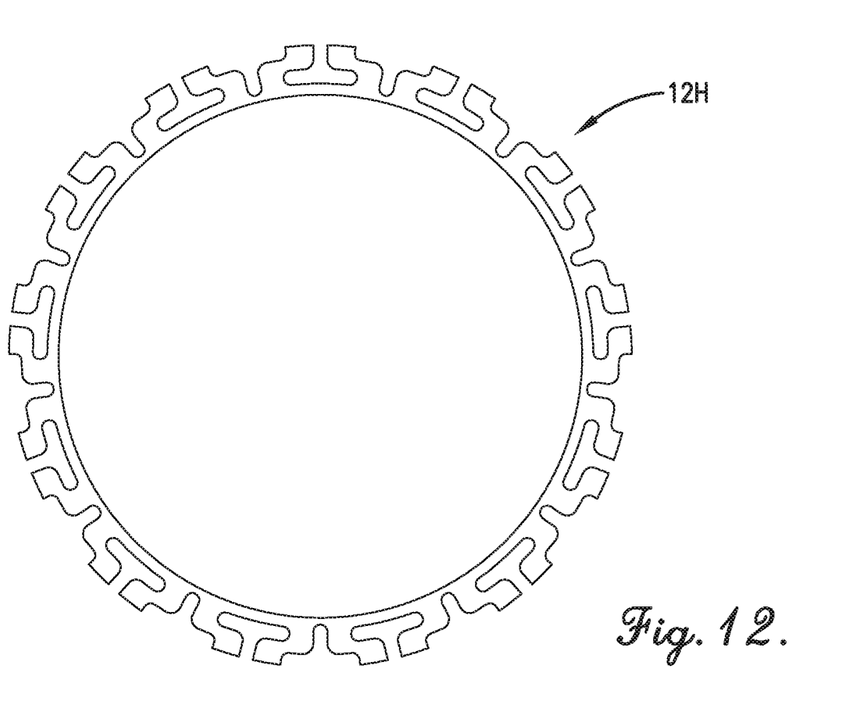
FIG. 12 is a side elevation view of a steering wheel cover core constructed in accordance with yet another embodiment of the invention.

A core 12H constructed in accordance with another embodiment of the invention is shown in FIG. 12 and includes ribs that form alternating relatively small and relatively large openings near the spines and on top of the core.

Figure 13:
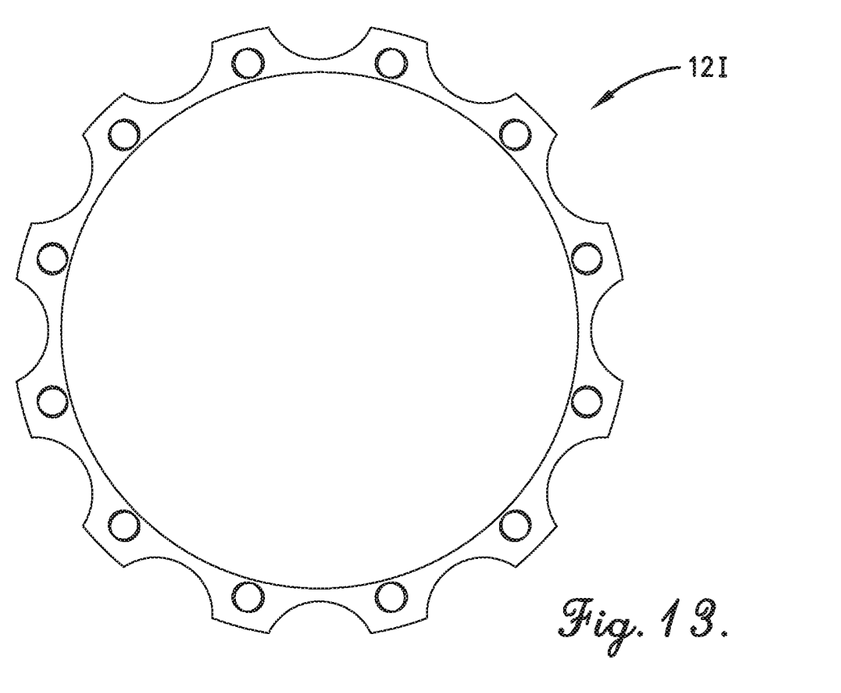
FIG. 13 is a side elevation view of a steering wheel cover core constructed in accordance with yet another embodiment of the invention.

A core 12I constructed in accordance with another embodiment of the invention is shown in FIG. 13 and includes ribs that form relatively small circular openings near the spies and relatively large oval-shaped openings on top of the core.

Figure 14:
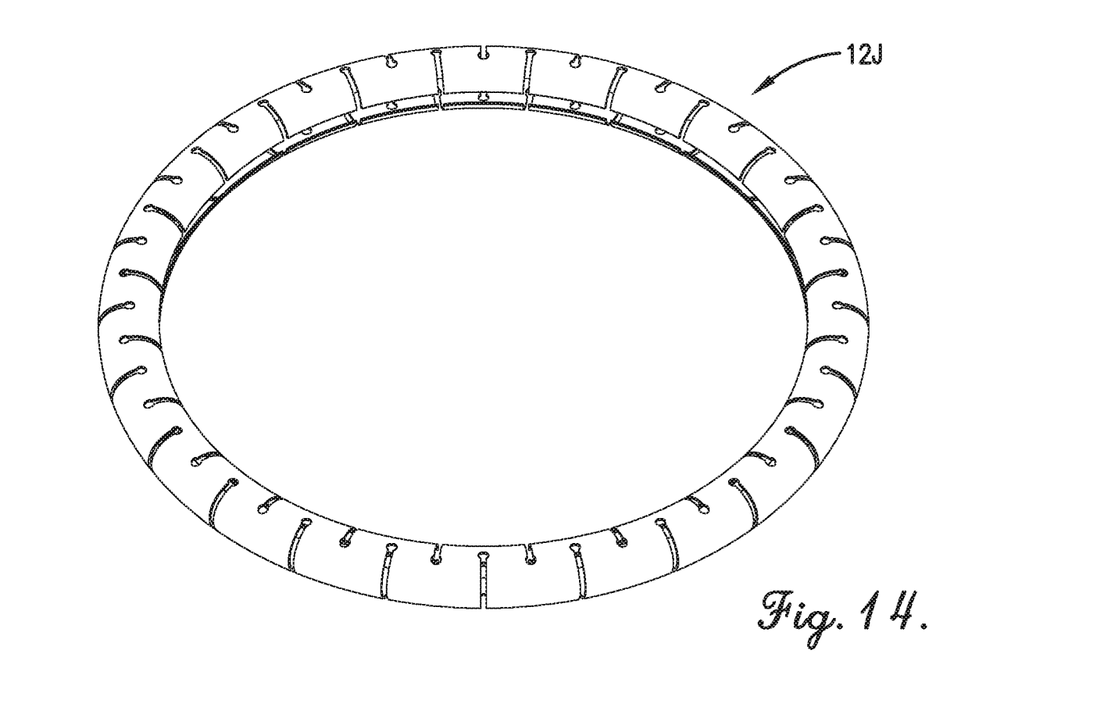
FIG. 14 is a perspective view of a steering wheel cover core constructed in accordance with yet another embodiment of the invention.

A core 12J constructed in accordance with another embodiment of the invention is shown in FIG. 14 and includes ribs that form relatively narrow openings or slots. This increases the rigidity of the core to compensate for overly stretchy materials.

Figure 15:
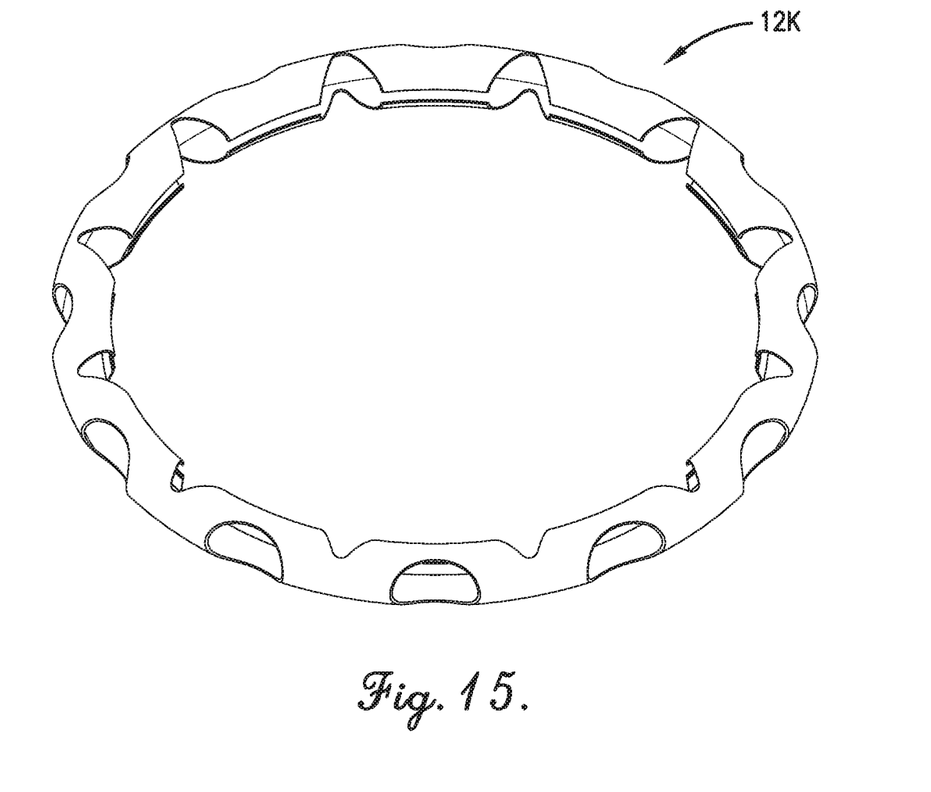
FIG. 15 is a perspective view of a steering wheel cover core constructed in accordance with yet another embodiment of the invention.

A core 12K constructed in accordance with another embodiment of the invention is shown in FIG. 15 and has spine sections that are interrupted/separated by openings and wider ribs.

Figure 16:
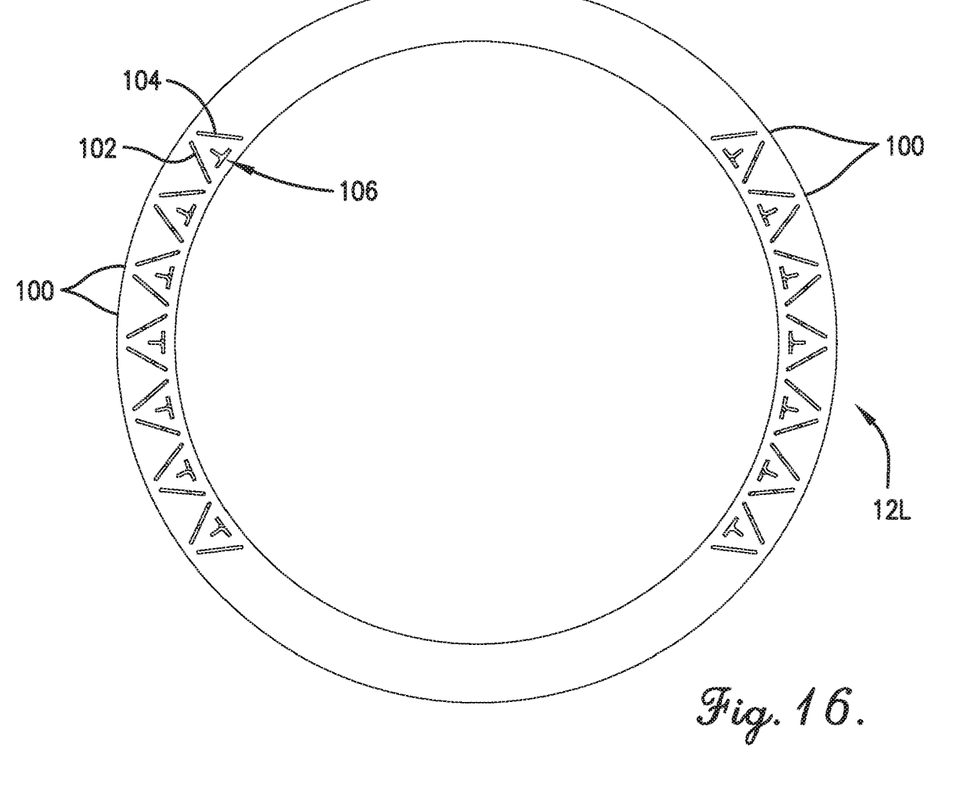
FIG. 16 is a side elevation view of a steering wheel cover core constructed in accordance with yet another embodiment of the invention.
Figure 17:
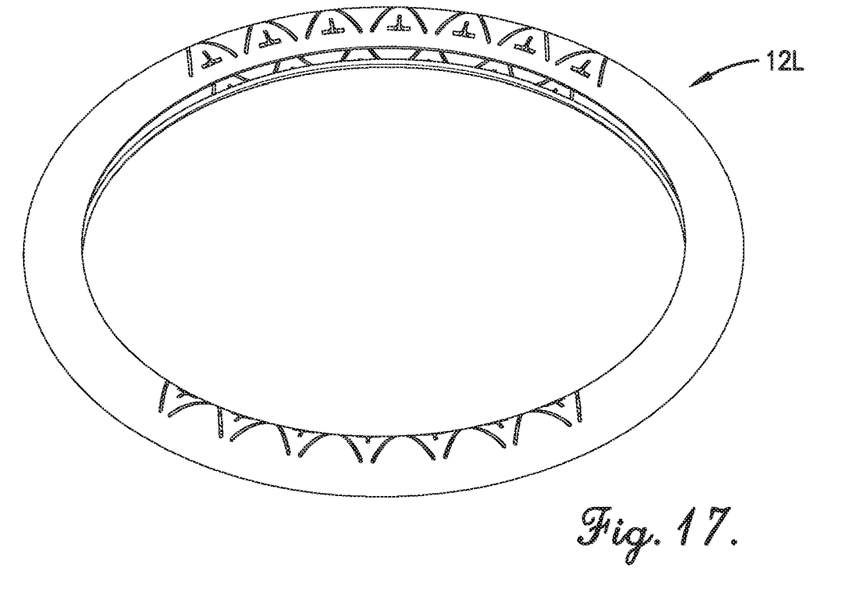
FIG. 17 is a perspective view of the steering wheel cover of FIG. 16.

A core 12L constructed in accordance with another embodiment of the invention is shown in FIGS. 16 and 17. This embodiment of the core has a series of repeating sets 100 of relief cuts on its front and rear sides that define a spring-like structure. Each set of relief cuts 100 includes two angled linear cuts 102, 104 and an inverted T-shaped cut 106 between the angled linear cuts. These relief cuts allow the core, when covered by an outer casing, to feel more like a traditional steering wheel cover while still achieving the installation objectives described above.

Although the invention has been described with reference to the embodiments illustrated in the attached drawing figures, it is noted that equivalents may be employed and substitutions made herein without departing from the scope of the invention as recited in the claims. In one embodiment, the relief cuts are narrow slits. In other embodiments, the relief cuts are wider so as to reduce the amount of material in the core. The relief cuts may be between 1/32"-1/4" wide.

Having thus described various embodiments of the invention, the following includes possible patentable subject matter:

What is claimed:

1. A steering wheel cover comprising:
    an inner core made of thermoplastic elastomer (TPE) material or molded ethylene-vinyl acetate (EVA) foam and comprising front and rear spines and a plurality of ribs extending in arcs between the front and rear spines and separated by openings, each of the ribs including:
        a stem connected to the front spine and a stem connected to the rear spine; and
        a plurality of branches connected to each stem and separated by a slot; and
    an outer casing that at least partially encloses the inner core.

2. The steering wheel cover as set forth in claim 1, each of the front and rear spines having a lip.

3. The steering wheel cover as set forth in claim 1, the inner core further comprising conjoined areas between the branches of adjacent ribs.

4. The steering wheel cover as set forth in claim 1, wherein the ribs are wider than the openings.

5. The steering wheel cover as set forth in claim 1, wherein the ribs are narrower than the openings.

6. A steering wheel cover comprising:
    an inner core comprising:
        front and rear spines;
        a plurality of spaced slots extending from the front spine and a plurality of spaced slots extending from the rear spine, the slots defining a plurality of spaced arc-shaped ribs extending between the front and rear spines; and
    an outer casing that at least partially encloses the inner core, wherein the inner core has a thickness of approximately 0.55 inches, which is approximately 13.97 mm.

7. The steering wheel cover as set forth in claim 6, wherein the ribs are wider than the slots.

8. The steering wheel cover as set forth in claim 7, wherein the slots each have a linear section and an enlarged non-linear head.

9. The steering wheel cover as set forth in claim 6, wherein the inner core is made of thermoplastic elastomer (TPE) material.

10. The steering wheel cover as set forth in claim 6, wherein the inner core is made of molded ethylene-vinyl acetate (EVA) foam.

11. The steering wheel cover as set forth in claim 6, wherein each of the front and rear spines includes a lip.

12. A steering wheel cover comprising:
    an inner core made of thermoplastic elastomer (TPE) material or molded ethylene-vinyl acetate (EVA) foam and comprising front and rear spines and a plurality of ribs extending in arcs between the front and rear spines and separated by openings;
    an outer casing that at least partially encloses the core, wherein the inner core has a thickness of approximately 0.55 inches, which is approximately 13.97 mm.

13. A steering wheel cover comprising:
    an inner core having a plurality of linear and non-linear relief cuts; and
    an outer casing that at least partially encloses the inner core, wherein the inner core has a thickness of approximately 0.55 inches, which is approximately 13.97 mm.

14. The steering wheel cover as set forth in claim 13, wherein the non-linear relief cuts are inverted T-shaped cuts.

15. A steering wheel cover comprising:
    an inner core having a plurality of relief cuts having at least two different shapes; and
    an outer casing that at least partially encloses the inner core, wherein the relief cuts include inverted T-shaped cuts.

16. A steering wheel cover comprising:
    an inner core having a plurality of relief cuts having at least two different shapes; and
    an outer casing that at least partially encloses the inner core, wherein the inner core has a thickness of approximately 0.55 inches, which is approximately 13.97 mm.

17. A steering wheel cover comprising:
an inner core having a plurality of relief cuts having at least two different shapes; and
an outer casing that at least partially encloses the inner core, wherein the relief cuts include oval-shaped cuts.

\* \* \* \* \*